United States Patent
Cho

(10) Patent No.: US 7,359,681 B2
(45) Date of Patent: Apr. 15, 2008

(54) TRANSMITTING APPARATUS AND METHOD OF MOBILE COMMUNICATION TERMINAL

(75) Inventor: Jeong Hyun Cho, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 656 days.

(21) Appl. No.: 10/903,272

(22) Filed: Jul. 30, 2004

(65) Prior Publication Data
US 2005/0026573 A1     Feb. 3, 2005

(30) Foreign Application Priority Data
Jul. 30, 2003    (KR) .................. 10-2003-0052845

(51) Int. Cl.
*H04B 1/02*     (2006.01)

(52) U.S. Cl. .................. 455/107; 455/126; 455/127.1; 455/193.1

(58) Field of Classification Search .................. 455/94, 455/114.2–114.3, 107, 280, 80, 325, 193.1, 455/150.1, 130, 121, 129, 78, 82–83, 289, 455/269, 248.1, 193.2, 180.1, 115.1, 126, 455/127.1, 87, 575.7, 91; 330/302–306, 330/277; 343/821, 852, 860–861
See application file for complete search history.

(56) References Cited

U.S. PATENT DOCUMENTS 5,208,537 A      5/1993  Rietsch et al. .............. 324/322
5,784,687 A *    7/1998  Itoh et al. ..................... 455/78
6,895,225 B1 *   5/2005  Talvitie et al. ................ 455/78
7,174,142 B2 *   2/2007  Watabe ..................... 455/193.1
2002/0086643 A1* 7/2002  Leipala ........................ 455/80
2004/0224649 A1* 11/2004 Shamsaifar ................ 455/107

FOREIGN PATENT DOCUMENTS

| EP | 1 220 456 A2 | 7/2002 |
| JP | 07-007357 | 1/1995 |
| JP | 7046064 | 2/1995 |
| JP | 08-288865 | 11/1996 |
| JP | 10-150339 | 6/1998 |
| JP | 11-068611 | 3/1999 |
| JP | 2000-349656 | 12/2000 |
| JP | 2001-244899 | 9/2001 |
| JP | 2001-339317 | 12/2001 |
| KR | 10 20000001318 A | 1/2000 |
| KR | 1020030062134 A | 7/2003 |
| KR | 20-0360827 | 9/2004 |

* cited by examiner

*Primary Examiner*—Pablo N. Tran
(74) *Attorney, Agent, or Firm*—Lee, Hong, Degerman, Kang & Schmadeka

(57) ABSTRACT

A mobile communication terminal transmitter comprises a detecting unit for detecting at least one of a first power level and a first power of reflection; a baseband signal processing unit for outputting at least one of a bias voltage and a power control signal, wherein the bias voltage controls an impedance of the antenna, and the power control signal is applied to an output power correcting unit; and an antenna matching unit for adjusting the amplified transmission signal according to the bias voltage.

11 Claims, 2 Drawing Sheets

TRANSMITTING APPARATUS AND METHOD OF MOBILE COMMUNICATION TERMINAL

CROSS REFERENCE TO RELATED APPLICATIONS

Pursuant to 35 U.S.C. § 119(a), this application claims the benefit of earlier filing date and right of priority to Korean Patent Application No. 2003-52845, filed on Jul. 30, 2003, the content of which is hereby incorporated by reference herein in its entirety.

BACKGROUND OF THE INVENTION

1. Field of the Invention

The present invention relates to a transmitting apparatus and method of a mobile communication terminal, and more particularly, to a transmitting apparatus and method of a mobile communication terminal capable of correcting power changes due to an impedance change of an antenna and a mismatching of the antenna.

2. Description of the Related Art

In general, an antenna of a mobile communication terminal changes its impedance characteristics depending on its distance from a user, the user's size, or the position the user is using the mobile terminal. Generally, a transmission signal is transmitted after being corrected through an antenna matching unit.

FIG. 1 is a block diagram showing the construction of a related art transmitting apparatus of a mobile communication terminal.

As shown in FIG. 1, the related art transmitting apparatus includes a mixer 2 for up-converting a frequency of a transmission signal inputted through a baseband signal processor 1 and outputting a radio frequency signal; a first amplifier 4 for filtering the high frequency signal outputted from the mixer 1 and amplifying it to a certain level; a second amplifier 6 for amplifying a signal outputted from the first amplifier 4 through a second filter 5; a third filter 8 for filtering a signal inputted through an isolator 7 after being transmitted from the second amplifier 6; a coupler 9 for detecting power of a signal outputted from the third filter 8; an antenna matching unit 10 for correcting a signal outputted through the coupler 9 and transmitting the signal to an antenna 11; and a baseband signal processor 1 for outputting a power control signal according to power of the signal detected by the coupler 9 and controlling the first and second amplifiers 4 and 6 according to the power control signal.

The transmitting apparatus of a mobile communication terminal constructed as described above operates as follows.

The baseband signal processor 1 applies a transmission signal to the mixer 2. The mixer 2 up-converts a frequency of the transmission signal and outputs a radio frequency signal. The first filter 3 restrains generation of a spurious frequency, and a signal outputted from the first filter 3 is amplified to a certain level in the first amplifier 4 and inputted to the second amplifier 6 after passing through the second filter 5.

The second amplifier 6 amplifies the signal received from the second filter 5 to a certain level, and the amplified signal is filtered in the third filter 8 after passing through the isolator 7. The isolator 7 protects the second amplifier 6 from reflection wave generated due to impedance mismatching and prevents load change after the second amplifier 6 to thereby prevent change in output power. The coupler 9 transmits a signal outputted from the third filter 8 to the antenna matching unit 10. The signal transmitted to the antenna matching unit 10 is impedance matched and transmitted externally through the antenna 11.

The coupler 9 divides a portion of the signal outputted from the third filter 8 and transmits the divided portion of the signal to the baseband signal processor 1. Then, the baseband signal processor 1 controls the first amplifier 4 and the second amplifier 6 according to a difference between the power of the signal and the power of the transmission signal, thereby adjusting output power of the transmission signal.

Some mobile communication terminals do not have the isolator 7 due to size and cost limitations. As a result, the impedance change in the antenna produces a load change in the power amplifier. As a result, so the output power of the transmission signal is changed in an undesirable manner. The antenna 11 of the mobile communication terminal is exposed to users and environment and thus, the impedance of the antenna is frequently changed.

The related art transmitting apparatus of the mobile communication terminal has the following problems. Since the level of the signal outputted from the power amplifier changes due to the impedance change of the antenna, power of the transmission signal changes. A signal cannot be radiated with accurate power, as a result, and the communication quality is degraded. In addition, in order to satisfy an electromagnetic wave regulation through an SAR, radiation performance of the antenna is attenuated even in a free space state, so that the impedance is changed and the terminal is mismatched with the antenna frequently.

A solution to the above problems is needed.

SUMMARY OF THE INVENTION

The present invention provides a transmitting apparatus and method for detecting an impedance change of an antenna and correcting an output power of a power amplifier and a mismatching of the antenna. Accordingly, a transmitter for transmitting an amplified transmission signal over an antenna of a mobile communication terminal is provided.

The transmitter comprises a detecting unit for detecting at least one of a first power level and a first power of reflection, wherein the first power level is associated with the amplified transmission signal and the first power of reflection is associated with a return signal generated by the antenna; a baseband signal processing unit for outputting at least one of a bias voltage and a power control signal, wherein the bias voltage controls an impedance of the antenna, and the power control signal is applied to an output power correcting unit; and an antenna matching unit for adjusting the amplified transmission signal according to the bias voltage.

In one embodiment, the detecting unit is a directional coupler. The directional coupler comprises a coupler port for detecting power level of the amplified transmission signal; and an isolation port for detecting power of the return signal generated by the antenna. The baseband signal processing unit stores at least one of the power control signal and the bias voltage based on a change in power of the amplified transmission signal. The antenna matching unit comprises a matching adjusting unit having a variable capacitance controllable by the bias voltage.

In accordance with another embodiment, the transmitter comprises an output power correcting unit for controlling a gain in a transmission signal in accordance with a power control signal; a matching adjusting unit for compensating an impedance of an antenna of the mobile communication terminal in accordance with a bias voltage in order to adjust the transmission signal; a detecting unit for detecting a power level of the transmission signal amplified to a first level in the output power correcting unit, and for detecting a power level of a reflected signal from the antenna, due to an impedance change in the antenna; and a baseband signal processing unit for outputting the power control signal and the bias voltage based on the power level of the transmission signal and the power of the reflected signal.

The matching adjusting unit has a capacitance adjustable according to the bias voltage. The matching adjusting unit is installed between the antenna and an output port of the detecting unit. The detecting unit is a coupler having at least one port for detecting at least one of the power level of the transmission signal and the power level of the reflected signal. The baseband signal processing unit stores at least one of the power control signal and the bias voltage corresponding to a change in power of the transmission signal.

In accordance with one embodiment, a method for transmitting signals from a mobile communication terminal is provided. The method comprises determining a power level of a transmission signal; determining a power level of a reflected signal from an antenna of the mobile communication terminal; determining a power control signal to compensate output power of the transmission signal; when the detected power level is different from a previous power level of the transmission signal; and determining a bias voltage for adjusting an impedance of the antenna.

The output power of the transmission signal is adjusted based on the power control signal. The impedance of the antenna is controlled based on the bias voltage. The power control signal and the bias voltage are determined based on values stored in a baseband signal processing unit.

In another embodiment, a transmitter of a mobile communication terminal comprises a detector for detecting power of an input signal and a change of impedance; a signal processor for controlling at least one of amplification and impedance of the input signal according to a change in the detected power and the change in impedance; at least one amplifier for controlling a gain of the input signal according to a control signal generated by a signal processor; and a matching unit for controlling an impedance of the input signal according to the gain controlled by said at least one amplifier.

The detector comprises a first port connected to the amplifier for detecting a change in power received from the amplifier. The detector may further comprise a second port connected to an antenna and detecting a change in impedance of a carrier signal received from an antenna of the mobile communication terminal. In one embodiment, the detector further comprises a DC converter for converting the change in impedance into a DC value. The signal processor outputs a power control signal corresponding to the change in the detected power. The signal processor outputs a bias voltage corresponding to the change in impedance.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements.

DETAILED DESCRIPTION OF THE PREFERRED EMBODIMENTS

Figure 1:
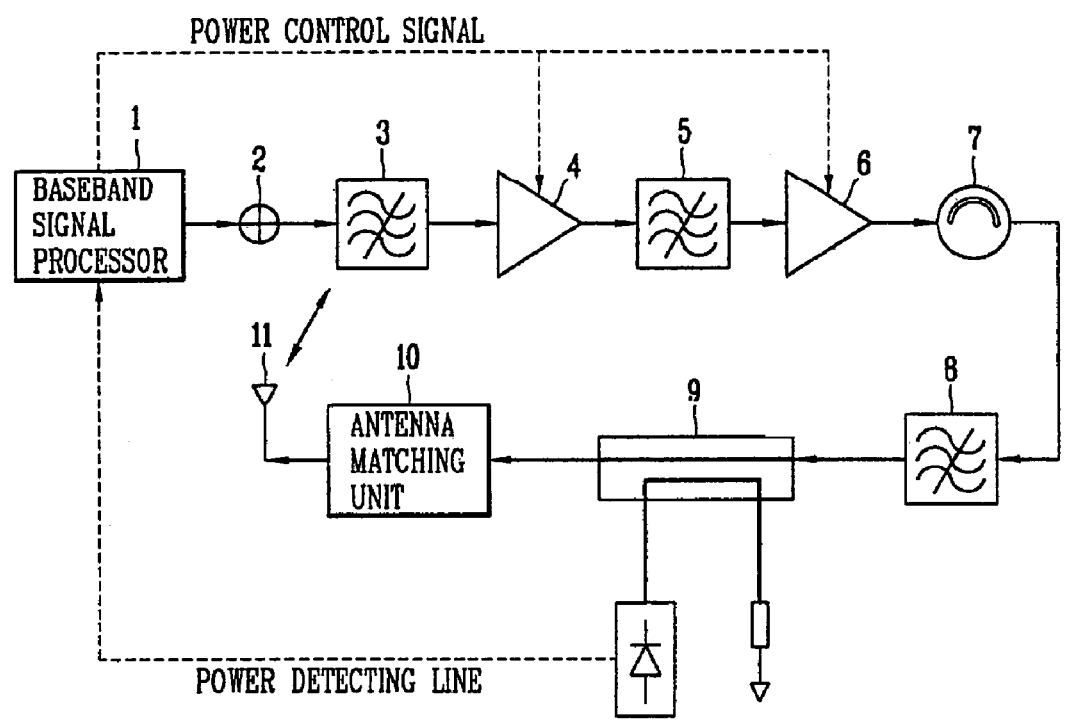
FIG. 1 is a block diagram showing the construction of a related art transmitting apparatus of a mobile communication terminal.
Figure 2:
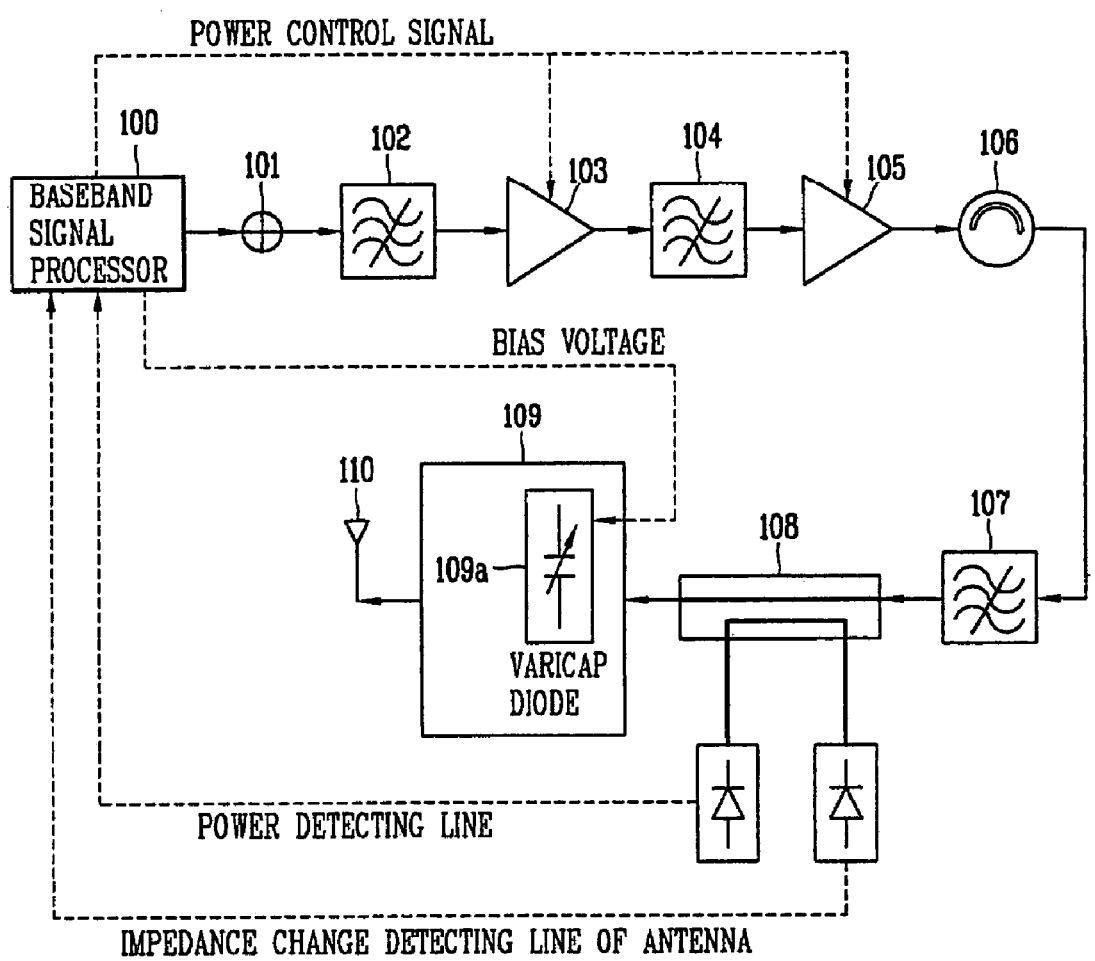
FIG. 2 is a block diagram showing the construction of a transmitting apparatus of a mobile communication terminal in accordance with a preferred embodiment of the present invention.

Referring to FIG. 2, a transmitting apparatus of a mobile communication terminal in accordance with the present invention comprises a mixer 101 for up-converting a frequency of a transmission signal inputted through a baseband signal processing unit 100 and outputting a radio frequency signal; a first filter 102 for filtering the radio frequency signal outputted from the mixer 101; a first amplifier 103 for amplifying a signal outputted from the first filter 102 to a certain level according to a power control signal.

A second filter 104 for filtering a signal outputted from the first amplifier 103 and a second amplifier 105 for amplifying a signal outputted from the second filter 104 is included to amplify the signal to a certain level according to the power control signal. A third filter 107 for filtering an output signal of the second amplifier 105 inputted after passing through an isolator 106; and a directional coupler 108 for dividing a signal outputted from the third filter 107 to detect a power level and an impedance change of an antenna may be also included in one embodiment.

A baseband signal processing unit 100 for receiving the power level and the impedance change which have been detected in the directional coupler 108 and outputting power control signal for controlling the first and second amplifiers 103 and 105 and a bias voltage for matching an impedance of the antenna 110; an antenna matching unit 109 for correcting a transmission signal inputted through the directional coupler 108 after being outputted from the third filter 107 by using the bias voltage; and an antenna 110 for externally transmitting a final transmission signal outputted from the antenna matching unit 109 may be also included.

In one embodiment, the directional coupler 108 is a detecting unit which extracts a portion of a signal outputted from the third filter 107 and transmitted to the antenna matching unit 109 to detect a power level and a change of the antenna impedance. Namely, in the directional coupler 108, a coupler port detects a power level of the transmission signal transmitted to the antenna 110 and an isolation (termination) port converts reflection wave returned after being reflected from the antenna 110 into a power value, thereby detecting a change of the impedance of the antenna 110.

A converter for converting an RF signal into a DC voltage is connected to the isolation port of the directional coupler 108. The baseband signal processing unit 100 generates a power control signal to be applied to the output power correcting unit and a bias voltage to be applied to a matching adjusting unit. The output power correcting unit refers to the first amplifier 103 and the second amplifier 105 which controls a gain of the transmission signal according to the power control signal, and the matching adjusting unit is a varicap diode 109a of the antenna matching unit 109.

The baseband signal processing unit 100 stores change values of DC power by various states of the antenna, a power control signal value and a bias voltage value. When a mobile communication terminal is tuned, power values detected by the directional coupler 108 and the varicap diode 109a are stored. Power values change according to a state of the antenna 110. The power control signal value and the bias voltage may be used also to define change in power values.

In one embodiment, the antenna matching unit 109 controls the impedance matching of the antenna by changing a capacity of the varicap diode 109a according to the bias voltage. The transmitting apparatus of a mobile communication terminal constructed as described above operates as follows.

The transmission signal outputted from the baseband signal processing unit 100 is inputted to the first amplifier 103 through the mixer 101 and the first filter 102. The first amplifier 103 amplifies the transmission signal to a certain level and outputs it to the second filter 104.

The baseband signal processing unit 100 previously stores at least one bias voltage value compensating an impedance change in the antenna matching unit 109 and the power control signal compensating the output values of the first and second amplifiers 103 and 105. Accordingly, the baseband signal processing unit 100 applies the bias voltage and the output control signal for compensating the transmission signal to the varicap diode 109a of the antenna matching unit 109 and the first and second amplifiers 103 and 105.

The signal outputted after passing through the second filter 104 is amplified to a certain level in the second amplifier 105, and a signal outputted from the second amplifier 105 is inputted to the third filter 107 via the isolator 106, where its spurious radio frequency component is removed, and then a signal without the spurious radio frequency component is outputted.

The signal outputted from the third filter 108 is divided into a final transmission signal to be transmitted externally through the antenna 110 and a signal for detecting a power level of the final transmission signal in the directional coupler 108. The signal separated for detecting the power level is converted into a power value in the coupler port and then inputted into the baseband signal processing unit 100, and the final transmission signal is applied to the antenna matching unit 109 installed between the antenna 110 and the output port of the directional coupler 108.

The final transmission signal applied to the antenna matching unit 109 is impedance-matched through the varicap diode 109a and then transmitted externally through the antenna 110. The isolation port of the directional coupler 108 detects reflection wave returned after being reflected from the antenna 110, converts the reflection wave to a power value, and transmits the value to the baseband signal processing unit 100.

If the power value transmitted from the directional coupler 108 is different from a previous power value, the baseband signal processing unit 100 determines that an impedance of the antenna has been changed, detects a power control signal and a bias voltage that can compensate power change value from previously stored values, and applies them to the first and second amplifiers 103 and 104 and the antenna matching unit 109. The present invention is not limited to the transmission signal apparatus and can be also applied to a receiving apparatus having the similar signal processing technique.

The transmitting apparatus of the mobile communication terminal in accordance with the present invention has the following advantages. By detecting the impedance change of the antenna and correcting output power of a power amplifier and mismatching of the antenna, change of a transmission output of the power amplifier is prevented and performance of the antenna is enhanced.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A transmitter for transmitting an amplified transmission signal over an antenna of a mobile communication terminal, the transmitter comprising:
    a detecting unit for detecting at least one of a first power level and a first power of reflection, wherein the first power level is associated with the amplified transmission signal and the first power of reflection is associated with a return signal generated by the antenna;
    a baseband signal processing unit for outputting at least one of a bias voltage and a power control signal, wherein the bias voltage controls an impedance of the antenna, and the power control signal is applied to an output power correcting unit; and
    an antenna matching unit for adjusting the amplified transmission signal according to the bias voltage, wherein the baseband signal processing unit stores at least one of the power control signal and the bias voltage based on a change in power of the amplified transmission signal.

2. The transmitter of claim 1, wherein the detecting unit is a directional coupler.

3. The transmitter of claim 2, wherein the directional coupler comprises:
    a coupler port for detecting power level of the amplified transmission signal; and
    an isolation port for detecting power of the return signal generated by the antenna.

4. The transmitter of claim 1, wherein the antenna matching unit comprises a matching adjusting unit having a variable capacitance controllable by the bias voltage.

5. A transmitter of a mobile communication terminal, the transmitter comprising:
    an output power correcting unit for controlling a gain in a transmission signal in accordance with a power control signal;
    a matching adjusting unit for compensating an impedance of an antenna of the mobile communication terminal in accordance with a bias voltage in order to adjust the transmission signal;
    a detecting unit for detecting a power level of the transmission signal amplified to a first level in the output power correcting unit, and for detecting a power level of a reflected signal from the antenna, due to an impedance change in the antenna; and
    a baseband signal processing unit for outputting the power control signal and the bias voltage based on the power level of the transmission signal and the power of the reflected signal, wherein the baseband signal processing unit stores at least one of the power control signal and the bias voltage corresponding to a change in power of the transmission signal.

6. The transmitter of claim 5, wherein the matching adjusting unit has a capacitance adjustable according to the bias voltage.

7. The transmitter of claim 5, wherein the matching adjusting unit is installed between the antenna and an output port of the detecting unit.

8. The transmitter of claim 5, wherein the detecting unit is a coupler having at least one port for detecting at least one of the power level of the transmission signal and the power level of the reflected signal.

9. A method for transmitting signals from a mobile communication terminal, the method comprising:
    determining a power level of a transmission signal;
    determining a power level of a reflected signal from an antenna of the mobile communication terminal;
    determining a power control signal to compensate output power of the transmission signal; when the detected power level is different from a previous power level of the transmission signal; and
    determining a bias voltage for adjusting an impedance of the antenna, wherein the power control signal and the bias voltage are determined based on values stored in a baseband signal processing unit.

10. The method of claim 9, further comprising:
    adjusting the output power of the transmission signal based on the power control signal.

11. The method of claim 9, further comprising:
    adjusting the impedance of the antenna based on the bias voltage.

* * * * *